March 4, 1941.                J. W. HOLMAN                2,233,530
                          CLOTH MEASURING DEVICE
                          Filed Oct. 18, 1939          2 Sheets-Sheet 1
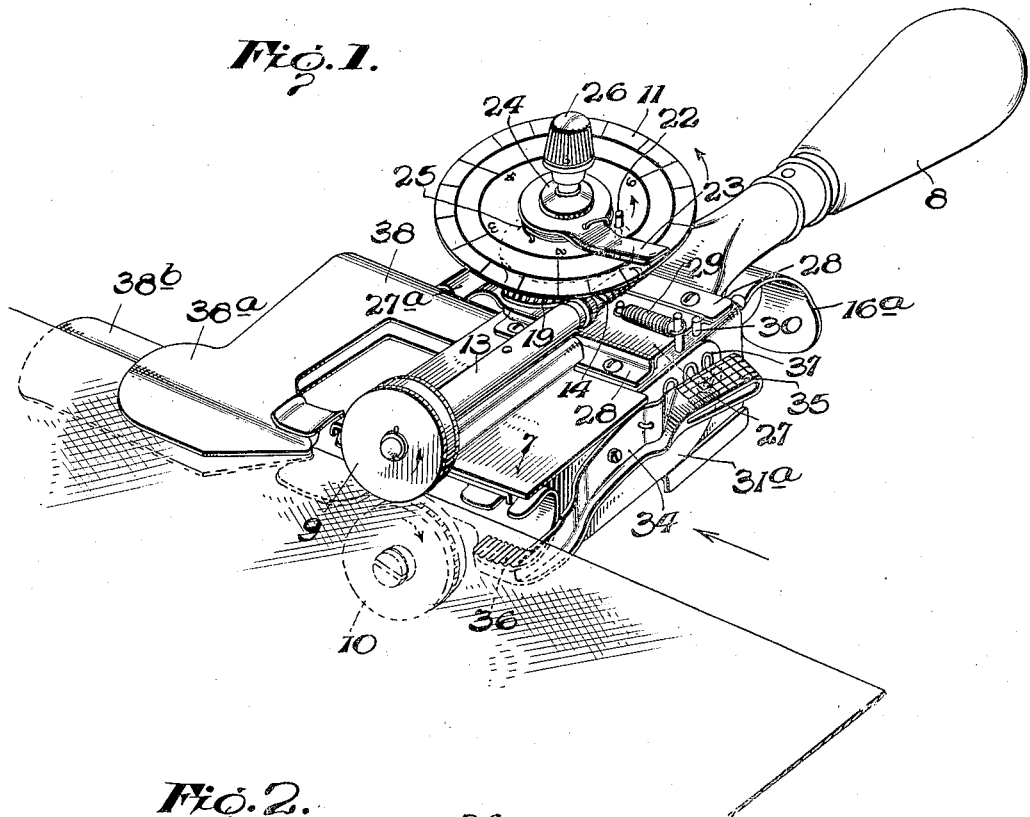
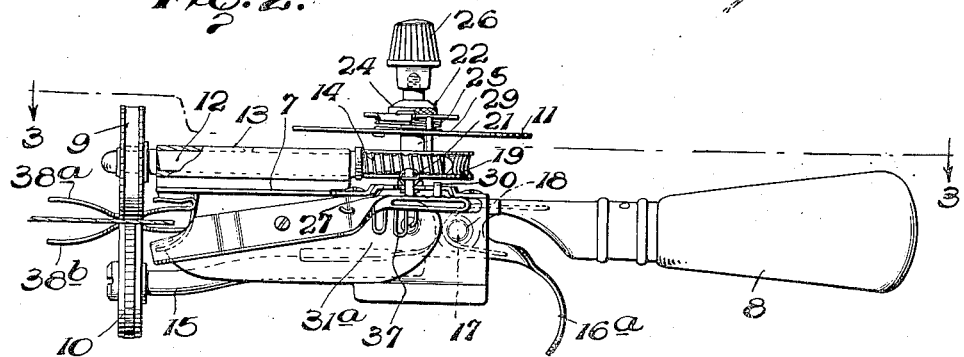
Inventor
J. W. Holman.
By Wilkinson & Groff
Attorneys March 4, 1941.  J. W. HOLMAN  2,233,530
CLOTH MEASURING DEVICE
Filed Oct. 18, 1939  2 Sheets-Sheet 2
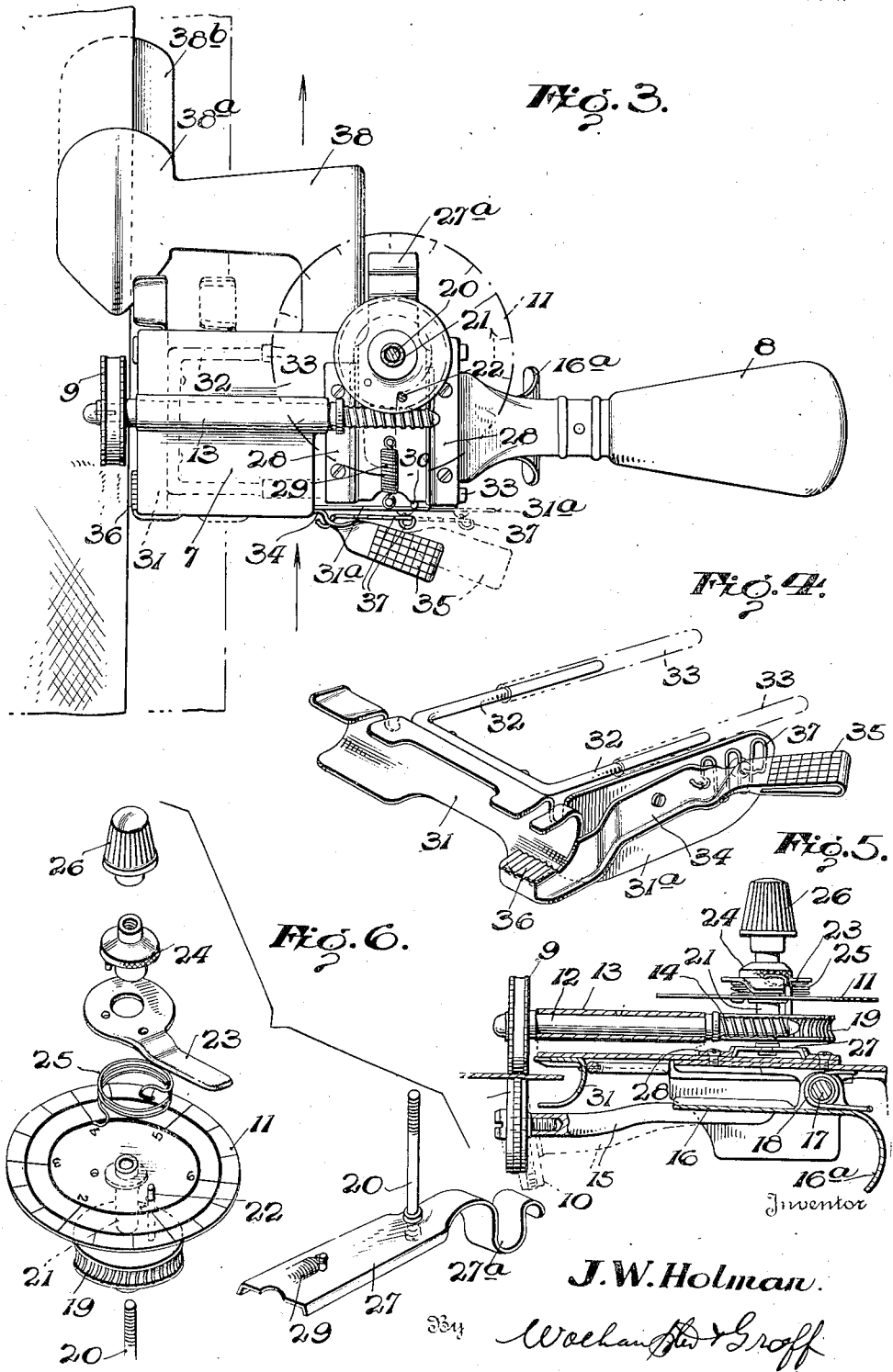
J. W. Holman.

Patented Mar. 4, 1941

2,233,530

UNITED STATES PATENT OFFICE 2,233,530

CLOTH MEASURING DEVICE

John W. Holman, Atchison, Kans.

Application October 18, 1939, Serial No. 300,059

4 Claims. (Cl. 33—134)

This invention relates to cloth measuring devices of the class comprising oppositely rotatable wheels between which the cloth is engaged in a relative movement along its edge, the said wheels, or one of the same, having operative connection with a registering or recording mechanism by which the extent of such movement translated into lineal measure is indicated.

An object of the invention is to provide a device of the stated kind in which the registering or recording mechanism can be released from its drive connection and will automatically return or reset itself to zero position, following a completed measuring operation, by a simple manipulation or movement by the fingers.

Another object is to provide such a device adapted to be easily and quickly applied or engaged with the cloth over its edge from the side, so as to facilitate and render its use most expeditious.

A further object is to provide a device as characterized equipped with means for gauging the positioning or distancing of the engaging wheels from the cloth edge and for clamping or holding the device stationary at a desired point upon the cloth, as after a measuring operation, awaiting or during a cutting.

Combined with said objects, the general aim and purpose of the invention is to provide an improved practicable construction of such a device in a tool operable or manipulatable by hand and adapted to measure relatively short extents or lengths of cloth lightness, simplicity and easy use being essential requirements.

An illustrative device embodying the invention in one practical form is shown for example in the accompanying drawings by reference to which in further description of the same hereinafter the invention will be readily understood.

In said drawings:

Figure 1 is a front-end perspective view of the device as applied in operative relation to the edge of a strip of cloth;

Figure 2 is a left side elevation of said device, partly in section;

Figure 3 is a top plan and partly sectional view on the line 3—3 of Figure 2;

Figure 4 is a perspective view of a detail of construction taken in the same direction of Figure 1;

Figure 5 is a sectional broken away view corresponding otherwise substantially to Figure 2; and Figure 6 is a perspective detail view of certain of the parts shown in separated assemblage relation.

The illustrative device in its more or less common components comprises a carrier base or body 7, a handle 8 attached to said base, a pair of superimposed oppositely rotatable rollers 9 and 10 carried by the base between which the cloth is engaged, and a registering or indicator dial 11 mounted on the base through which the rotation of one of said rollers is translated into lineal or yardage measure.

The upper roller 9 of the superimposed pair is carried on one end of a straight rotatable shaft 12 supported in a bearing 13 upon the base, the other end of which carries or is formed into a gear worm 14. The lower roller 10 of said pair is carried on the end of a bent non-rotatable shaft or rod 15 extending from a plate 16 pivoted to the underside of the base or handle—as by side swivels or a pivoting pin 17—and having a rearward trigger-like portion 16ª by which it may be rocked by finger pull so as to swing said roller downward away from the upper roller as indicated by the dotted line positioning in Figure 5, a spring 18 tensioned against said plate—between it and the base—serving to hold it with the roller normally in cooperative contact with the upper roller. Thus, the two rollers are caused to bear or tend to bear rotatably against each other, with opposite directional relationship, the first being arranged to give rotation to its supporting shaft and the second merely idling.

The aforesaid gear worm 14 on the first roller shaft engages with a worm wheel 19. Said worm wheel is mounted upon a shaft 20 at right angular relation to the first named shaft (see Fig. 3), in this instance by an interposed sleeve 21 to which it is fixed or bound, said sleeve, however, being loosely revolvable on the shaft which is stationary. Above the worm wheel, also mounted upon said shaft by the intervening sleeve to which it likewise is fixed or bound, is the aforementioned registering or indicator dial 11, having engaged connection as by pin 22 with said worm wheel so as to definitely key the two members together upon the said sleeve. Above said dial is a pointer 23 held on the shaft by an interlocking nut 24 screwed to said shaft, a coil spring 25 being interposed between the dial and said pointer, with tensioned opposite and engagement with each, so as to mildly resist rotation of the dial in one direction and to more forcibly rotate or return it to a starting or normal position in the opposite direction when the dial is freed to the latter movement. In this connection, the aforenamed pin 22 serves as a stop at the normal zero point of the dial, for which purpose it is raised slightly above the dial surface so as to bear or strike against one side of the pointer 23 as will appear from Fig. 1. It will be understood that said pointer 23 remains always stationary, while the dial is arranged to turn operatively in the direction indicated by the arrow adjacent thereto in Fig. 1. A cap 26 is screwed to the shaft on top of said interlocking stationary nut, thus completing the assembly on said shaft.

This entire assembly, including the aforenamed shaft 20, and illustrated in separated assembly relation in Fig. 6, is in turn mounted upon a sliding member on the base. Said sliding member comprises a plate 27 movable between guides 28 at right angles to the operating shaft 12 and having a rearward grasp portion 27a by which to be pulled backward by the fingers. A spring 29 on its forward end tends to draw and hold it normally forward against a stop 30. The aforesaid shaft 20 having a base support in this member, as shown in the detail of Fig. 6, carries the described assembly thereon with the worm wheel 19 normally engaging the gear worm 14 under the action of said spring 29.

It will be understood that the aforesaid dial 11 is graduated into unit and fractional scale or measure markings, based upon the yard or other lineal measure, and it is adapted in this instance to register or measure up to six and a fraction yards. Being in effect unitary with the worm wheel 19, this dial, of course, rotates therewith upon drive of the gear worm on shaft 12 as the upper roller 9 is itself rotated in the proper direction indicated by the arrow upon that roller (see Fig. 1). Its ratio to said roller, which may be termed the "measuring roller", is therefore the same as said worm wheel. This ratio—in this instance approximately 1 to 70—is such that rotation of said measuring roller over or upon a piece of cloth for a given distance is translated into a movement of the dial through a limited arc representing the equivalent of said distance, this arc movement being with reference to the pointer 23 starting with the point at which the dial is stopped—by the pin 22—against said pointer which is its zero or normal position. It will be understood that the measuring extent of the dial can be made as large or small as desired, depending merely upon its ratio, or that of the actuating worm wheel, to the measuring roller.

Behind the pair of superimposed cooperating rollers on the forward end of the base, a gauge 31 is provided for the purpose of regulating the extent to which the same are engaged over or along the cloth edge. Said gauge consists of a relatively horizontal trough-like plate (see Fig. 4) opposed to the plane of said rollers at substantially the level of their contact with each other, adapted to bear against the edge of the cloth so as to limit the distance at which they may be engaged therewith from said edge. It is adjustably movable forward and back with relation to the rollers upon rearward carrier arms 32 slidable in guide-sleeves 33 on the underside of the base of the device. On one side, being the left one in this instance, a rearwardly extended portion 31a thereof also slides in a guide-way formed by or in the side of said base. This rearwardly extended portion carries thereon a clamping member comprising the arm or lever 34 intermediately pivoted thereto, the rearward end of which is formed into a finger depressable shank or button 35 and the forward end of which is formed into a clamping jaw 36, the same being held tensionally in either of its up and down swing positions by a balance-spring 37 connected therewith from an anchor point in said gauge portion. Said clamping member serves to clamp and hold the device stationary on the cloth when so desired, as when a cutting is to be made after a measuring operation.

To facilitate engagement of the device, or its cooperating rollers upon a piece of cloth, a guide 10 is provided in an advanced or leading position ahead of said rollers, in this instance on the right hand side of the device. Said guide comprises upper and lower leaf members 38a and 38b, respectively, on an arm 38 supported from the base. In a practical embodiment, these may consist simply of sheet plate pieces, or a single piece of sheet metal cut to form with a bended fold back upon itself. In addition to facilitating the engagement of the device or rollers upon the cloth, these guide members in advance of the rollers serve to smooth out the cloth passing therebetween.

In operation, the oppositely rotatable rollers 9 and 10 are engaged with the cloth by pulling upon the trigger portion 16a so as to separate said rollers and passing the same with the aid of the guide members 38a and 38b over the edge of the cloth to the extent permitted by the gauge 31, whereupon said trigger portion is released and the device is ready for operation. This application is, of course, made at the point where the beginning of a measurement is to be made, that is, with the rollers engaging or gripping the cloth at such point or the line from which the measure is to be taken. The device is then simply drawn along the edge of the cloth, with the guide members 38a and 38b smoothing out the material as it progresses, so that the cooperating rollers will rotate on opposite sides of the cloth. The rotation of the upper "measuring roller" is transmitted through its shaft and gear worm 14 to the worm wheel 19. This transmitted rotation is communicated to the dial 11, through its connection with said worm wheel, at the reduced ratio in which the device is constructed and so moves said dial at a much lower speed rate. Being graduated suitably according to the operative ratio of the parts, the dial indicates the extent of measure from the "measuring roller" rotation by its markings with reference to the stationary pointer 23 and its function in this way may be continued until it has been rotated through its complete operative cycle or limit of measure. Thus, wherever it is brought to rest at the conclusion of a measuring operation, the marking thereon immediately underlying the pointer will indicate the extent of lineal measure through which the device has been drawn over the cloth. Upon completion of the measuring operation, the slide plate 27 is drawn by pull upon its grasp portion 27a so as to disengage the worm wheel 19 from the gear worm 14 so as to allow the spring 25 to return both the dial and said worm wheel back to the beginning or zero position, determined by the strike and stop of the pin 22 against the pointer arm 23. Each measuring operation, of course, starts from this zero position. The slide plate 27 is then released to reengage the worm wheel 19 with the gear worm 14 under pull of the spring 29.

At any point of pause in the measuring operation, for a cutting or other purpose, the clamping member 34 may be engaged to grip and hold the device stationary on the cloth by simply depressing its shank 35 by the thumb, and it is released, of course, by pressure in the opposite direction.

While the illustrative device has been described as one in which the registering or indicator is rotated with reference to a stationary pointer, it will be understood that the reverse of this arrangement may be employed and that the pointer instead may be rotated with reference to the dial which in such case would be stationary. Also, other variations or changes may be made in the arrangement and form of the specific parts and general construction of the device without departing from the actual scope of the invention. Therefore, it is not intended to limit the invention by the appended claims to the specific construction illustrated and described, beyond what said claims by their terms themselves impose.

The term "oppositely rotating rollers" as hereinafter used in the claims will be understood to have reference to the superimposed cooperating rollers, the upper of which performs the measuring or drive operation, and to include any such arrangement of rollers, wheels or the like performing the same function.

Having thus described my invention, what I claim as new and desire to secure by Letters Patent of the United States is:

1. In combination, a cloth measuring device including a frame and a pair of rollers carried thereby and spring pressed to grip the edge of a length of cloth between and to be rotated by frictional engagement therewith upon relative movement of the cloth and device, length indicating means actuated by the rotation of one of said rollers, and releasable gripping means carried by the frame for gripping the frame to the cloth and preventing relative movement of the cloth and frame.

2. In combination, a cloth measuring device including a frame and a pair of rollers carried thereby and spring pressed to grip the edge of a length of cloth between and to be rotated by frictional engagement therewith upon relative movement of the cloth and device, length indicating means actuated by the rotation of one of said rollers, releasable gripping means carried by the frame for gripping the frame to the cloth and preventing relative movement of the cloth and frame, said last mentioned means including a flanged channel-like guide member adapted to embrace the cloth edge, and a lever pivoted to the guide member and having a gripping jaw cooperating with one flange of the guide member to grip the cloth.

3. In combination, a cloth measuring device including a frame and a pair of rollers carried thereby and spring pressed to grip the edge of a length of cloth between and to be rotated by frictional engagement therewith upon relative movement of the cloth and device, length indicating means actuated by the rotation of one of said rollers, releasable gripping means carried by the frame for gripping the frame to the cloth and preventing relative movement of the cloth and frame, said last mentioned means including a flanged channel-like guide member adapted to embrace the cloth edge, a lever pivoted to the guide member and having a gripping jaw cooperating with one flange of the guide member to grip the cloth, spring means positioned to hold the gripping jaw selectively in cloth gripping position and in free position from the cloth, and finger engaging means carried by the lever for shifting the same between said positions.

4. In combination, a cloth measuring device including a frame and a pair of rollers carried thereby and spring pressed to grip the edge of a length of cloth between and to be rotated by frictional engagement therewith upon relative movement of the cloth and device, length indicating means actuated by the rotation of one of said rollers, releasable gripping means carried by the frame for gripping the frame to the cloth and preventing relative movement of the cloth and frame, said last mentioned means including a flanged channel-like guide member adapted to embrace the cloth edge, and a lever pivoted to the guide member and having a gripping jaw cooperating with one flange of the guide member to grip the cloth, said gripping means being mounted on said frame to slide toward and from the cloth edge.

JOHN W. HOLMAN.